United States Patent [19]
Maitland et al.

[11] Patent Number: 4,794,614
[45] Date of Patent: Dec. 27, 1988

[54] DISCHARGE TUBES

[75] Inventors: Arthur Maitland, Fife; Hugh Menown, Chelmsford; Christopher V. Neale, Hatfield Peverel, all of United Kingdom

[73] Assignee: English Electric Valve Company Limited, Chelmsford, United Kingdom

[21] Appl. No.: 869,725

[22] Filed: Jun. 2, 1986

[30] Foreign Application Priority Data

Jun. 4, 1985 [GB] United Kingdom ............... 8514058

[51] Int. Cl.⁴ ............................................. H01S 3/03
[52] U.S. Cl. ...................................... 372/61; 372/56; 372/66
[58] Field of Search ................... 372/61, 65, 56, 66

[56] References Cited

U.S. PATENT DOCUMENTS

| | | | |
|---|---|---|---|
| 3,891,941 | 6/1975 | Roberts et al. | 372/56 |
| 3,947,781 | 3/1976 | Hernqvist | 372/56 |
| 3,988,698 | 10/1976 | Crane et al. | 372/65 |
| 4,052,680 | 10/1977 | Wang et al. | |
| 4,203,080 | 5/1980 | Wright et al. | 372/65 |
| 4,247,830 | 1/1981 | Karras et al. | 372/56 |
| 4,395,770 | 7/1983 | Silfvast | 372/87 |
| 4,559,466 | 12/1985 | Donaldson et al. | 372/56 |
| 4,639,926 | 1/1987 | Wang et al. | 372/56 |
| 4,644,554 | 2/1987 | Sheng | 372/61 |
| 4,649,547 | 3/1987 | Carlson et al. | 372/61 |

FOREIGN PATENT DOCUMENTS

| | | |
|---|---|---|
| 2824761 | 12/1978 | Fed. Rep. of Germany . |
| 2037478 | 7/1980 | United Kingdom . |
| 2079523 | 1/1982 | United Kingdom . |
| 2120838 | 4/1983 | United Kingdom . |
| 2126413 | 3/1984 | United Kingdom . |

*Primary Examiner*—Leon Scott, Jr.
*Attorney, Agent, or Firm*—Spencer & Frank

[57] ABSTRACT

A metal vapor discharge tube includes cylindrical dispenser blocks of sintered tungsten which are porous and support metal whose vapor is to form at least part of the active medium of the tube. Thus, the dispenser blocks retain the metal, holding it in position when in its solid and liquid states. Heat shields serve to retain heat within the envelope of the discharge tube and uniformly heat the cylinders.

18 Claims, 6 Drawing Sheets

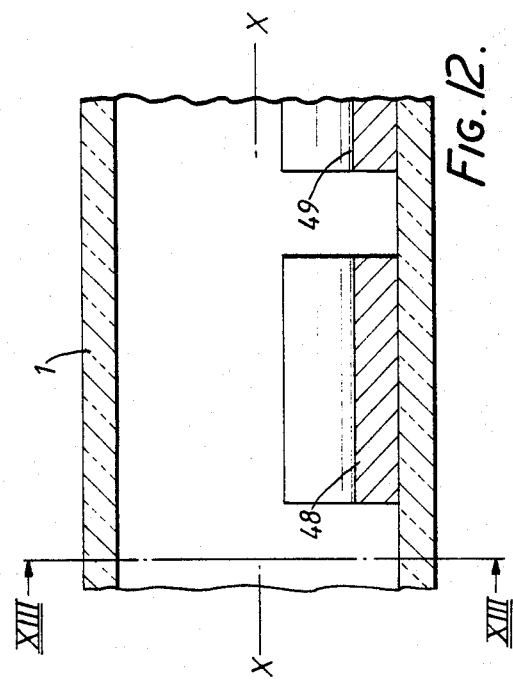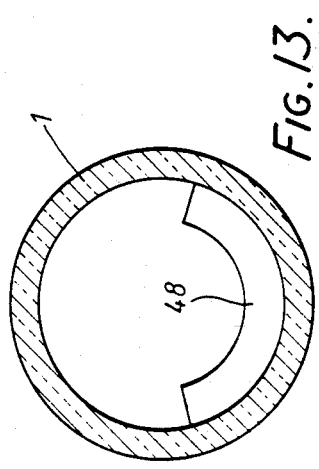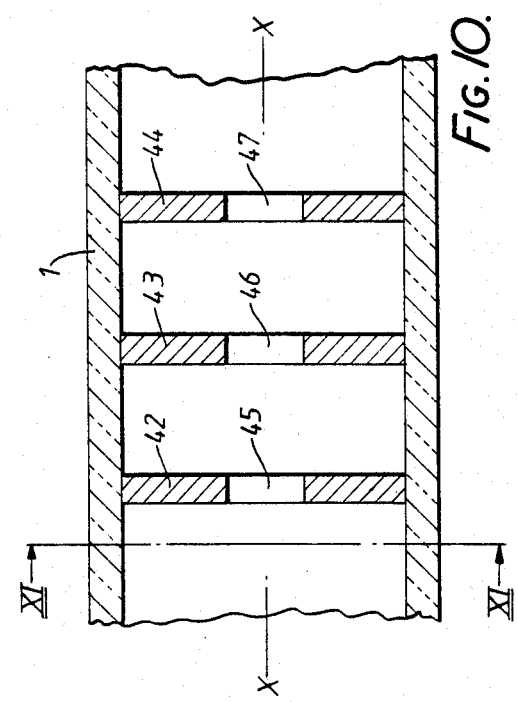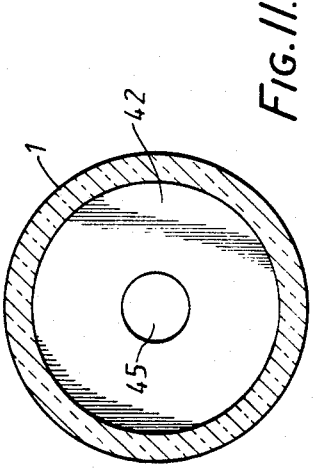

DISCHARGE TUBES

BACKGROUND OF THE INVENTION

This invention relates to discharge tubes and more particularly but not exclusively to metal vapour discharge tubes for use in metal vapour lasers.

In metal vapour laser discharge tubes the active medium of the tube is constituted, at least in part, by a metal vapour such as for example copper or lead in a buffer gas of, say, neon or helium. In previous discharge tubes of this type the metal, which is to be vaporised to form part of the active medium of the tube, is inserted in fragmented form into the tube prior to its operation. During operation of the tube a discharge is initially established in the buffer gas and the heat of the discharge causes the metal fragments to vaporise. However, problems may arise in such a conventional tube. The metal fragments may be deposited onto the laser windows when the laser is shipped and may enter the vacuum pump during evacuation of the system or pumping during laser operation. Also, molten metals can have deleterious effects on insulating surfaces of the tube. Another problem is that when the metal fragments have melted, conducting paths of random length and geometry are formed along the interior insulating surfaces of the tube, which can have undesirable effects on its operation as a laser, discharge tube or spectral source.

SUMMARY OF THE INVENTION

The present invention seeks to provide an improved discharge tube.

According to this invention, there is provided a metal vapour discharge tube comprising a structure for holding in position metal of the active medium prior to the metal vaporising, substantially the whole of the working surface of said structure being arranged to give off metal vapour during operation of the tube. The metal of the active medium is also termed the "discharge metal" in this Specification. By "holding in position" it is meant that when the discharge metal is in its solid or liquid state, its surface is held in substantially the same position. Thus, the said structure defines the position of the liquid metal surface and, although individual atoms or molecules move within the liquid, its surface is kept in substantially the same location throughout operation of the tube until the discharge metal completely evaporates from the structure. By "working surface" that part of the said structure is meant which is a surface at which a change of state of the discharge metal occurs. For example, a change from the liquid state to vapour or vice versa.

By employing the invention, the discharge metal may be held in a desired location both in its solid form and whilst it melts. When it is in its liquid form it is thus prevented from forming undesirable conducting paths within the tube.

Preferably, the said structure comprises a plurality of segments, enabling parts of the tube where the metal vapour is to be dispensed to be more precisely chosen. With many important metal vapour lasers depression of metal vapour pressure due to the chemical reaction with the insulating tube walls which may be, for example, of ceramic, has deleterious effects on laser performance. The use of a segemented structure may greatly reduce this problem since the area of the insulating walls exposed to the discharge metal is reduced. However, the structure could have a single continuous working surface.

For some applications the structure may comprise at least one electrode, which may be one of said plurality of segments.

Advantageously, the said structure comprises at least one block, which may be termed a "dispenser block", of material arranged to support the discharge metal prior to vaporisation. The dispenser block locates the discharge metal to be vaporized and may be arranged to dispense the metal vapour into the discharge region. Preferably, the material is porous so that liquid metal may be soaked up by the material on placing the dispenser block in molten metal, before locating it in the discharge tube. Advantageously, the material is sintered tungsten of the type which may be used in dispenser cathodes. The dispenser block may be any suitable configuration but conveniently it is in the form of a hollow cylinder which may then be located coaxially about the longitudinal axis of the discharge tube.

Alternatively and also advantageously, the said structure may comprise a plurality of concentric cylinders at least one of which has a plurality of apertures therethrough and which conveniently may be metallic gauze. The cylinders need not have a circular cross-section and could be non-continuous around their circumferences. Preferably the structure comprises an inner cylinder of molybdenum gauze, and an outer cylinder of molybdenum, but of course other refractory metals such as tantalum can be used, there being between them an intermediate cylinder of the discharge metal. Such a structure is of relatively small thermal capacity and mass. Surface tension draws molten discharge metal to the inner part of the structure where it evaporates from the gauze.

Preferably the discharge tube includes a radiation shield surrounding substantially the whole of the said structure to improve the heat retentive properties of the tube, enabling temperatures of about 2,000° C. or so to be maintained. Suitable positioning of the radiation shield allows the working surface of the structure to be kept at a substantially uniform temperature.

Preferably, there is included an annular support arranged transversely to the longitudinal axis of the tube and having projections for supporting the said structure and advantageously the support has projections at right angles to its plane. The projections may support a ceramic spacer in addition to supporting the said structure. The annular support is preferably thin so that the thermal impedance between the structure and the envelope of the tube is small. This enables the structure to attain the required operating temperature more quickly than would otherwise be possible. Thermally induced stress on the envelope resulting from large temperature gradients are also reduced.

BRIEF DESCRIPTION OF THE DRAWINGS

The invention is now further described by way of example, with reference to the accompanying drawings, in which:

FIGS. 10 and 11 are schematic longitudinal and transverse sections respectively of part of a metal vapour discharge tube in accordance with the invention;

FIGS. 12 and 13 are schematic longitudinal and tranverse sections respectively of part of another discharge tube in accordance with the invention.

DESCRIPTION OF PREFERRED EMBODIMENTS

Figure 1:
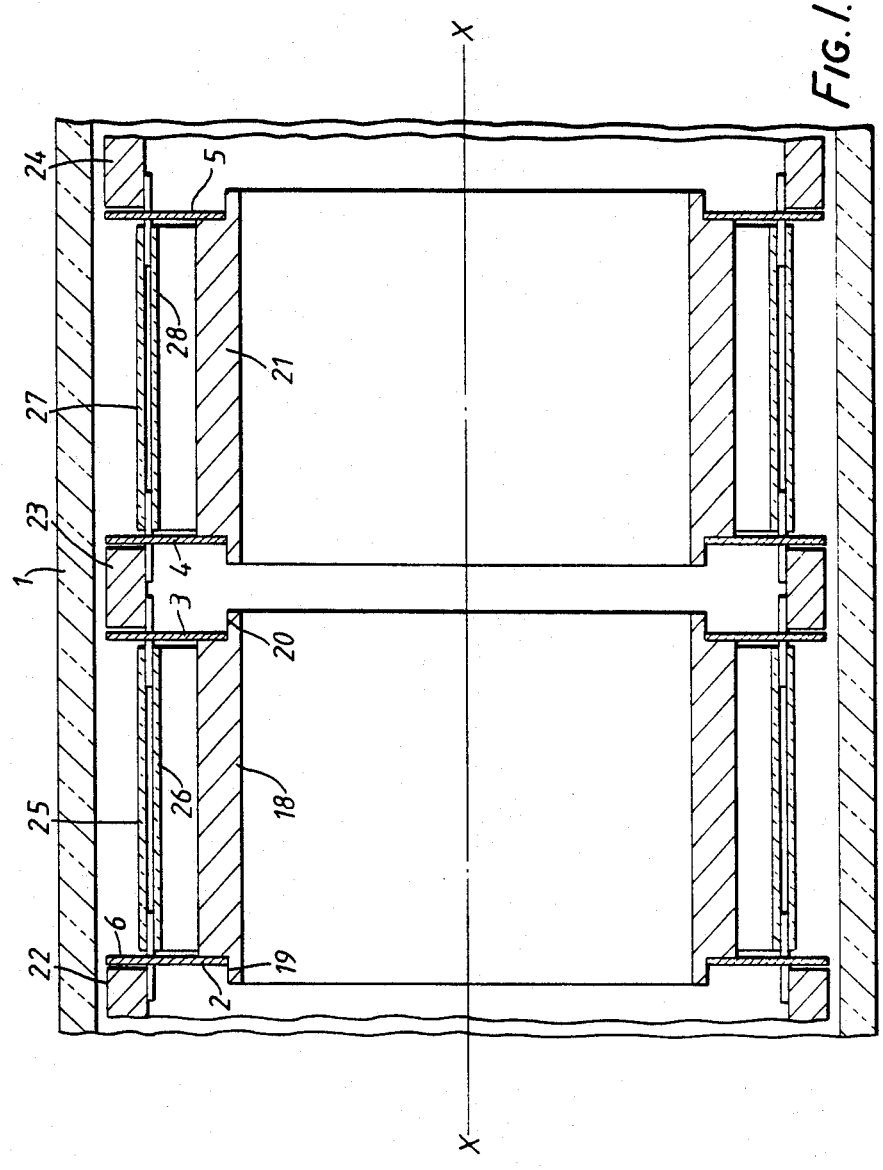
FIG. 1 schematically illustrates in longitudinal section part of a metal vapour discharge tube in accordance with the invention.
Figure 2:
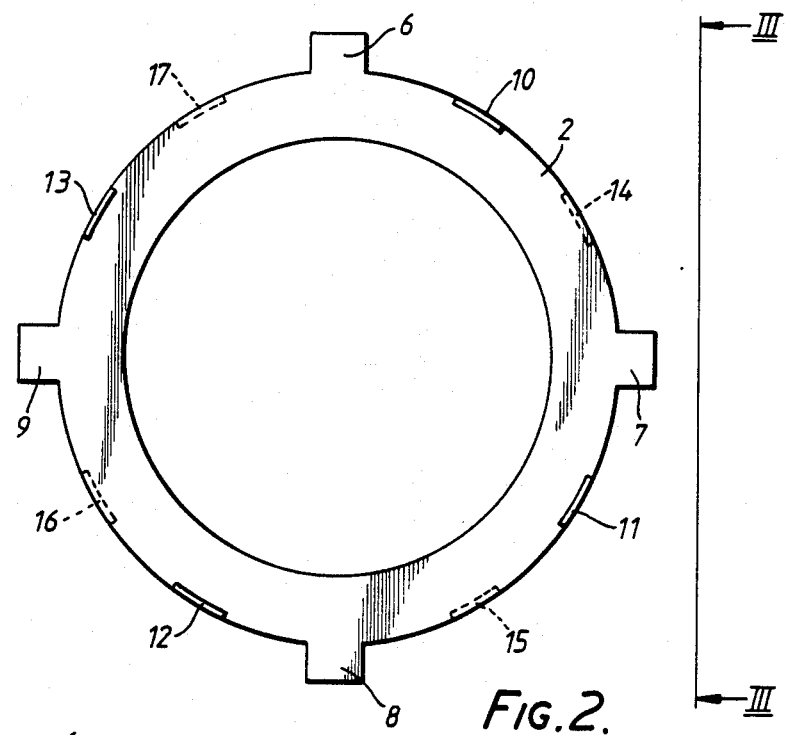
FIG. 2 shows part of the discharge tube of FIG. 1.
Figure 3:
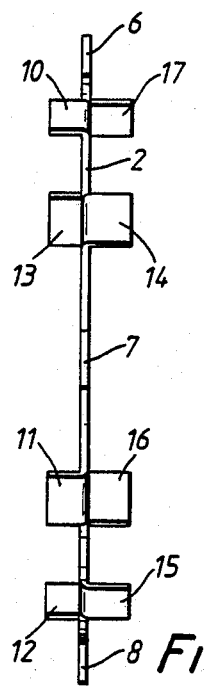
FIG. 3 is a side view taken along line III—III on FIG. 2.
Figure 4:
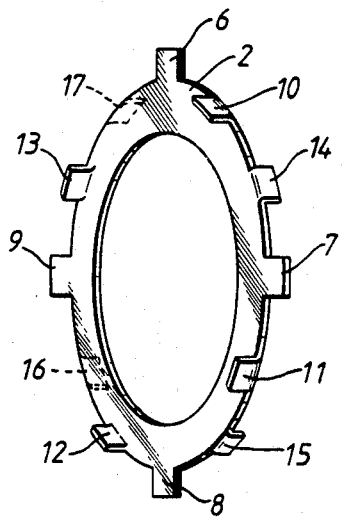
FIG. 4 is a perspective view of the part shown in FIG. 2.

With reference to FIG. 1, a metal vapour discharge tube has a ceramic envelope 1 within which are located a plurality of molybdenum supports 2, 3, 4 and 5. One of the molybdenum supports 2 is shown in further detail in FIGS. 2, 3 and 4. It is generally annular in shape and has a number of projections, four of which, 6, 7, 8 and 9 are located at 90° intervals around its outer circumference and lie in its plane. These serve to locate the spacer within envelope 1 so that it is tranverse to the longitudinal axis X—X of the discharge tube. The support 2 also includes eight further projections, four of which 10, 11, 12 and 13 are bent at 90° to the plane of the support 2 in one direction and the other four of which 14, 15, 16 and 17 are bent at 90° to its plane in the opposite direction.

The supports 2 and 3 are arranged to locate and support a porous dispenser member or block of sintered tungsten loaded with the discharge metal, the vapour of which is to form at least part of the active medium. The block is formed as a hollow cylinder 18 and is coaxially arranged about the axis X—X. The cylinder 18 has regions of reduced width forming ledges 19 and 20 at each end which locate it relative to the supports 2 and 3. The supports 4 and 5 similarly support and locate another cylinder 21 of sintered tungsten loaded with the discharge metal. Cylinders 18 and 21, together with other dispenser blocks not shown, form segments of a structure for holding the discharge metal in position during operation of the discharge tube, as is described further below.

The projections about the outer circumference of the supports 2, 3, 4 and 5 locate ceramic spacers 22, 23 and 24 which separate the cylinders 18 and 21. They also support cylindrical heat shields 25, 26, 27 and 28 of molybdenum foil, which are arranged to substantially surround the cylinders 18 and 21 and retain heat within the volume of the envelope 1 where discharge occurs during operation of the tube.

The cylinder 18 is porous and before it is inserted into the envelope 1, it is dipped into the required molten metal which enters and is retained in the pores of the cylinder 18. The cylinder 18 is then inserted into the envelope 1. The cylinder 21 and other cylinders forming the structure are similarly treated to load the discharge metal.

During operation of the tube, a discharge substantially along the axis X—X is initially established in a buffer gas within the envelope 1 and causes the internal temperature to rise. As the temperature rises the vapour pressure of the discharge metal increases to the required operating value, at which the metal may be molten. Surface tension retains the melted discharge metal within the cylinders 18 and 21 and thus holds it in position. The metal vapour is given off from substantially the whole of the working surfaces of cylinders 18 and 21 into the discharge region substantially along the axis X—X where it forms at least part of the active medium. In addition to evaporation, sputtering might be a significant process in the transfer of metal atoms or molecules from a dispenser block into the discharge region.

Figure 5:
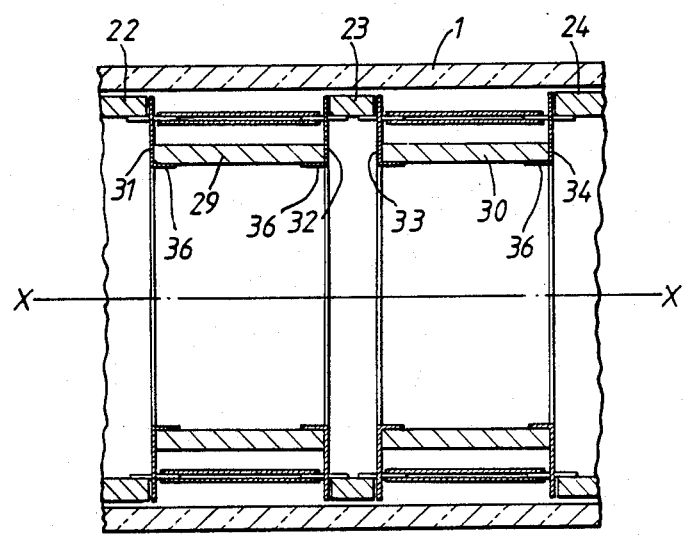
FIG. 5 is a schematic longitudinal section of part of a further discharge tube in accordance with the invention.
Figure 6:
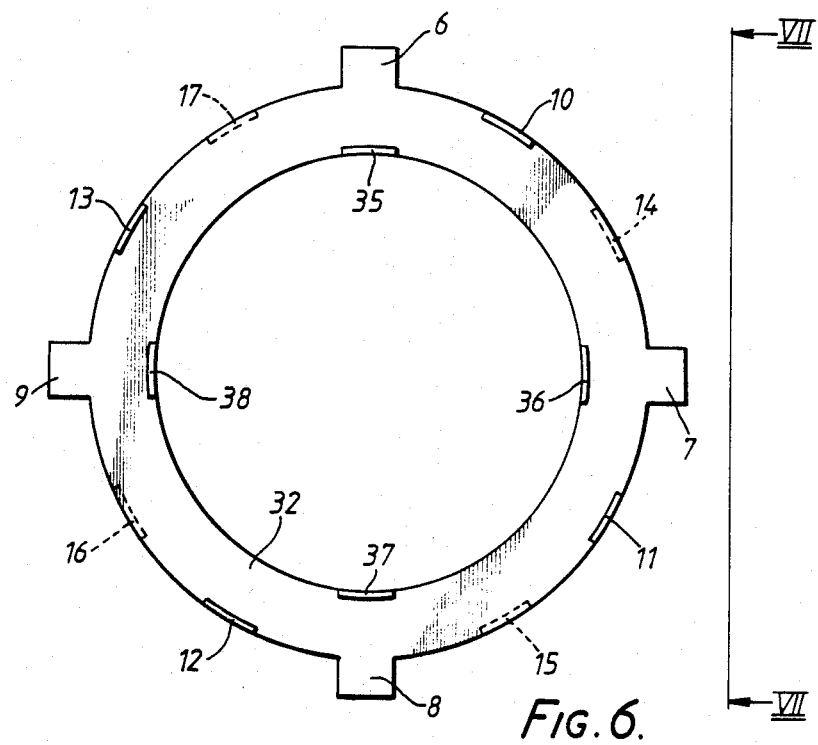
FIG. 6 shows part of the discharge tube of FIG. 5.
Figures 7, 8:
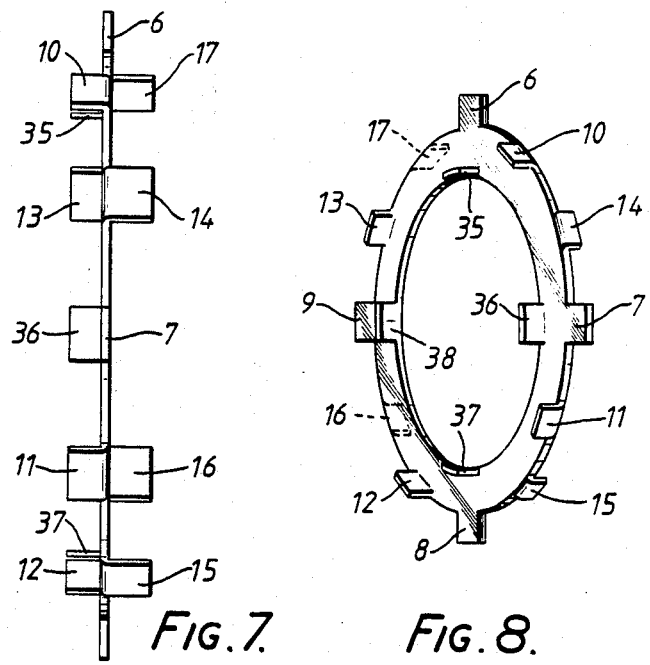
FIG. 7 is a view taken along the line VII—VII of FIG. 6.
FIG. 8 is a perspective view of the part shown in FIG. 6.

With reference to FIG. 5, another metal vapour discharge tube is similar to that described with reference to FIG. 1, and includes a structure comprising a plurality of hollow cylinders 29 and 30, and others not shown, of sintered tungsten to hold the discharge metal in position. However, the hollow cylinders 29 and 30 do not have regions of reduced width at each end. In this embodiment, the cylinders 29 and 30 are supported by supports 31, 32, 33 and 34 having additional projections 36 over the supports of the FIG. 1 embodiment. The support 32 is shown in greater detail in FIGS. 6, 7 and 8. It includes four further projections 35, 36, 37 and 38, located at the inner circumference of the support 32 and bent at right-angles to its plane. These additional projections 35, 36, 37 and 38 locate cylinders 29 and 30.

Figure 9:
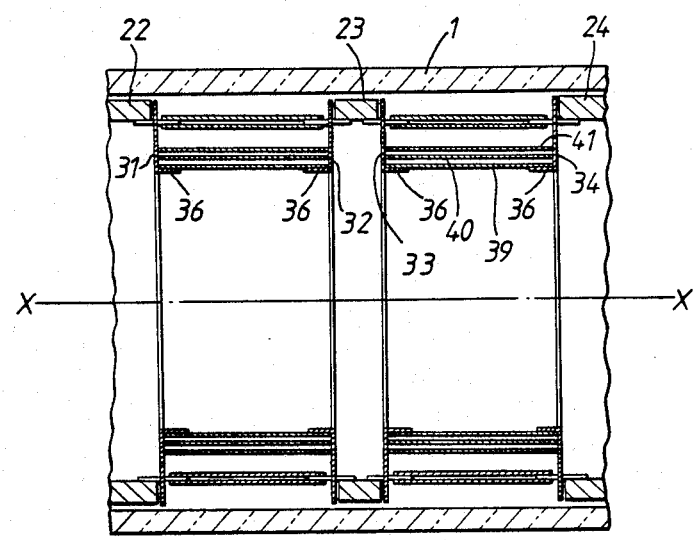
FIG. 9 is a schematic longitudinal section of part of another discharge tube in accordance with the invention.

With reference to FIG. 9, another metal vapour discharge tube employs supports 31, 32, 33 and 34 similar to those shown in FIG. 5, but instead of dispenser blocks of sintered tungsten the structure for holding the discharge metal in position comprises a plurality of concentric cylinders. The structure comprises an inner cylinder 39 of molybdenum gauze, an intermediate cylinder 40 of the discharge metal and an outer cylinder 41 of molybdenum which retains the discharge metal in position when it is molten. The discharge metal is given off as vapour at the surface of the molybdenum gauze 39. As the metal is vaporized at the surface, more is drawn by surface tension from the interior of the structure.

The structure for holding the discharge metal in position may comprise a plurality of generally transverse segments, such as shown in FIGS. 10 and 11. The metal vapour discharge tube illustrated in these figures includes dispenser blocks in the form of disks 42, 43 and 44 of sintered tungsten loaded with the discharge metal which are arranged substantially transversely along the axis X—X of the tube. Each disk has a central aperture 45, 46 and 47 aligned with the axis X—X.

With reference to FIGS. 12 and 13, the structure for holding the discharge metal in position may be assymetrical about the axis X—X of the discharge tube. In the illustrated metal vapour discharge tube a plurality of dispenser blocks 48 and 49 are only partcylindrical and do not extend around the whole of the inner circumference of the envelope 1.

Figure 14:
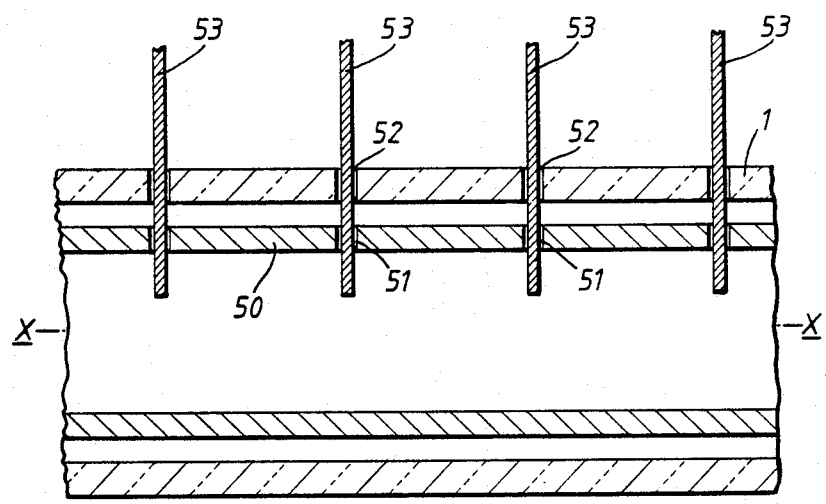
FIG. 14 schematically illustrates in longitudinal section part of another metal vapour discharge tube, with like references being used for like parts throughout.

Although the embodiments of the invention described above reference to FIGS. 1 to 13 show structures which each comprises a plurality of segments a structure could be employed which is continuous in configuration. Such a structure is included in the discharge tube illustrated in FIG. 14 and comprises only one dispenser block 50 of sintered tungsten loaded with the discharge metal. The dispenser block 50 is a cylinder and is arranged coaxially with the envelope 1 of the discharge tube. In this embodiment the dispenser block 50 is connected to act as a cathode, and it and the envelope 1 have apertures 51 and 52 respectively through which anode rods 53 extend.

The dimensions of a structure employed in a discharge tube depends on the active medium of the tube and its pressure, and whether it is operated in a pulsed or continuous wave (CW) mode.

We claim:

1. A metal vapor discharge tube employing an active medium comprising
    an envelope having a longitudinal axis; and
    at least one dispenser member, having a working surface, positioned within said envelope, said dispenser member having at least one aperture means retaining a discharge metal which
    upon heating of said discharge metal during excitation of said active medium emits a vapor over substantially the entire working surface of said member such that any condensation of said vapor on said dispenser member is also vaporized, said vapor forming at least a part of said active medium and said dispenser member having a higher melting point than said discharge metal.

2. A discharge tube as claimed in claim 1 which comprises a plurality of dispenser members.

3. A discharge tube as claimed in claim 1 wherein at least one of said dispenser members comprises an electrode.

4. A discharge tube as claimed in claim 1 wherein said at least one dispenser member is in the form of a block containing said discharge metal prior to vaporization.

5. A discharge tube as claimed in claim 4 wherein said block is made of a porous material.

6. A discharge tube as claimed in claim 4 wherein said block is made of sintered tungsten.

7. A discharge tube as claimed in claim 4 wherein said block is in the form of a hollow cylinder.

8. A discharge tube as claimed in claim 7 wherein said block has a region of reduced width at an end thereof.

9. A discharge tube as claimed in claim 4 wherein said block is a disk arranged substantially transversely to the longitudinal axis of said envelope.

10. A discharge tube as claimed in claim 17 which comprises a plurality of dispenser members in the form of concentric cylinders, at least one of said plurality of concentric cylinders having a plurality of apertures therethrough.

11. A discharge tube as claimed in claim 10 wherein each of said dispenser members comprises an inner cylinder made of a refractory metal gauze, an outer cylinder made of a refractory metal and an intermediate cylinder made of said metal interposed between said inner and outer cylinders, vapor emitted from said intermediate cylinder forming at least part of said active medium.

12. A discharge tube as claimed in claim 11 wherein said refractory metal is molybdenum.

13. A discharge tube as claimed in claim 1 including a radiation shield surrounding substantially said entire dispenser member.

14. A discharge tube as claimed in claim 1 which further comprises support means located within said envelope for positioning said dispenser member, and including at least one annular support arranged transversely to the longitudinal axis of said envelope, said support means having projections thereon for supporting said dispenser member.

15. A discharge tube as claimed in claim 14 wherein said annular support has a planar surface, said annular support having projections at right-angles to said planar surface.

16. A discharge tube as claimed in claim 14 wherein said projections support a ceramic spacer positioned adjacent said dispenser member.

17. A discharge tube as claimed in claim 1, wherein said dispenser member has a center portion and is positioned within said envelope to minimize the movement of said discharge metal of said dispenser member toward said center portion during operation of said metal vapor discharge tube.

18. A discharge tube as claimed in claim 1, wherein a discharge region is located within said envelope, and wherein said dispenser member substantially surrounds all of said discharge region.

* * * * *